(12) United States Patent
Kim

(10) Patent No.: US 10,359,882 B2
(45) Date of Patent: *Jul. 23, 2019

(54) ELECTRONIC DEVICE INCLUDING TOUCH-FINGERPRINT COMPLEX SENSOR

(71) Applicant: SAMSUNG ELECTRONICS CO., LTD., Suwon-si (KR)

(72) Inventor: Dongkyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/973,754

(22) Filed: May 8, 2018

(65) Prior Publication Data

US 2018/0260071 A1   Sep. 13, 2018

Related U.S. Application Data

(63) Continuation of application No. 15/094,296, filed on Apr. 8, 2016, now Pat. No. 9,990,081.

(30) Foreign Application Priority Data

Oct. 29, 2015 (KR) .......................... 10-2015-0151104

(51) Int. Cl.
G06F 3/041 (2006.01)
G06F 3/044 (2006.01)
G06K 9/00 (2006.01)

(52) U.S. Cl.
CPC ............ *G06F 3/0416* (2013.01); *G06F 3/044* (2013.01); *G06F 3/0412* (2013.01); *G06K 9/001* (2013.01);
(Continued)

(58) Field of Classification Search
CPC ...... G06F 3/0416; G06F 3/044; G06F 3/0412; G06F 2203/0416; G06K 9/002
See application file for complete search history.

(56) References Cited

U.S. PATENT DOCUMENTS

2012/0105081 A1   5/2012   Shaikh et al.
2013/0135247 A1   5/2013   Na et al.
(Continued)

FOREIGN PATENT DOCUMENTS

EP   3121695 A1   1/2017
JP   2008-040835 A   2/2008
(Continued)

OTHER PUBLICATIONS

Communication dated Apr. 5, 2017, issued by the European Patent Office in counterpart European Patent Application No. 16195793.1.
(Continued)

*Primary Examiner* — Liliana Cerullo
(74) *Attorney, Agent, or Firm* — Sughrue Mion, PLLC

(57) ABSTRACT

An electronic device includes a display panel configured to display an image, first electrodes provided on the display panel and arranged in parallel in a direction, second electrodes provided on the display panel and arranged in parallel in a direction crossing the first electrodes, an insulating layer provided between the first electrodes and the second electrodes, a controller configured to transmit driving signals to the first electrodes, and receive electrical signals from the second electrodes, touch detection areas and fingerprint-touch detection areas in which the first electrodes cross the second electrodes, and a protection film provided on the first electrodes and the second electrodes. The touch detection areas are arranged in a matrix of M rows and N columns, the fingerprint-touch detection areas are disposed at positions in
(Continued)

the matrix, and each of the fingerprint-touch detection areas includes fingerprint detection pixels.

22 Claims, 15 Drawing Sheets

(52) U.S. Cl.
CPC ......... *G06K 9/0002* (2013.01); *G06K 9/0008* (2013.01); *G06K 9/00013* (2013.01); *G06F 2203/0338* (2013.01); *G06F 2203/04106* (2013.01)

(56) References Cited

U.S. PATENT DOCUMENTS

| | | |
|---|---|---|
| 2013/0181949 A1 | 7/2013 | Setlak |
| 2014/0008115 A1 | 1/2014 | Sato et al. |
| 2014/0300574 A1 | 10/2014 | Benkley, III et al. |
| 2015/0036065 A1 | 2/2015 | Yousefpor et al. |
| 2015/0177884 A1 | 6/2015 | Han |
| 2016/0154988 A1 | 6/2016 | Benkley, III |
| 2016/0210494 A1* | 7/2016 | Zhao .................. G06K 9/00026 |
| 2016/0335467 A1* | 11/2016 | Su ........................ G06K 9/0002 |
| 2016/0364591 A1 | 12/2016 | El-Khoury et al. |
| 2017/0024602 A1 | 1/2017 | Han et al. |

FOREIGN PATENT DOCUMENTS

| | | |
|---|---|---|
| KR | 10-2014-0046888 A | 4/2014 |
| KR | 10-1432988 B1 | 8/2014 |
| KR | 10-1473184 B1 | 12/2014 |
| KR | 10-2015-0073539 A | 7/2015 |
| KR | 10-2015-0087802 A | 7/2015 |

OTHER PUBLICATIONS

Hyungcheol Shin, et al., "A 55dB SNR with 240Hz Frame Scan Rate Mutual Capacitor 30×24 Touch-Screen Panel Read-Out IC Using Code-Division Multiple Sensing Technique", 2013 IEEE International Solid-State Circuits Conference, Session 22, Sensors & Displays, 22.5, Feb. 20, 2013, total 3 pages.

* cited by examiner

ELECTRONIC DEVICE INCLUDING TOUCH-FINGERPRINT COMPLEX SENSOR

CROSS-REFERENCE TO RELATED APPLICATIONS

This application is a continuation of U.S. patent application Ser. No. 15/094,296, filed Apr. 8, 2016, in the U.S. Patent and Trademark Office, which claims priority from Korean Patent Application No. 10-2015-0151104, filed on Oct. 29, 2015 in the Korean Intellectual Property Office, the disclosures of which are incorporated herein by reference in their entireties.

BACKGROUND

1. Field

Apparatuses and methods consistent with exemplary embodiments relate to a complex sensor capable of recognizing a touch and a fingerprint, a sensing method, and an electronic device including the complex sensor.

2. Description of the Related Art

Personal authentication using personal intrinsic features such as fingerprints, voice, faces, hands, or irises has increased. A personal authentication function may be used in a finance device, an access controller, a mobile apparatus, a laptop computer, etc. Recently, owing to the high popularity of mobile apparatuses such as smart phones, a fingerprint recognition apparatus for personal authentication may be employed to protect security information stored in a smart phone.

A touch screen apparatus of the smart phone may be attached to a display apparatus and provides an intuitive input interface to a user. The fingerprint recognition apparatus may be provided separately from the touch screen apparatus and may be capable of fingerprint recognition only when a determined position is touched.

SUMMARY

Exemplary embodiments may address at least the above problems and/or disadvantages and other disadvantages not described above. Also, the exemplary embodiments are not required to overcome the disadvantages described above, and may not overcome any of the problems described above.

One or more exemplary embodiments provide complex sensors capable of recognizing a touch and fingerprint, sensing methods, and electronic devices including the complex sensors.

According to an aspect of an exemplary embodiment, there is provided an electronic device including a display panel configured to display an image, first electrodes provided on the display panel and arranged in parallel in a direction, and second electrodes provided on the display panel and arranged in parallel in a direction crossing the first electrodes. The electronic device further includes an insulating layer provided between the first electrodes and the second electrodes, a controller configured to transmit driving signals to the first electrodes, and receive electrical signals from the second electrodes, touch detection areas and fingerprint-touch detection areas in which the first electrodes cross the second electrodes, and a protection film provided on the first electrodes and the second electrodes. The touch detection areas are arranged in a matrix of M rows and N columns, the fingerprint-touch detection areas are disposed at positions in the matrix, the positions being expressed as (row, column), based on one rule among (odd, odd), (even, even), (odd, even), and (even, odd), and each of the fingerprint-touch detection areas includes fingerprint detection pixels.

Each of the first electrodes may have a strip shape of a width, and the first electrodes may be repeatedly arranged with a period between each pair of the first electrodes.

Each of the second electrodes may have a strip shape of a width, and the second electrodes may be repeatedly arranged with a period between each pair of the second electrodes.

The width of the first electrodes may be approximately equal to the width of the second electrodes, and the period between each pair of the first electrodes may be approximately equal to the period between each pair of the second electrodes.

The width of the first electrodes may be greater than the width of the second electrodes.

Each of the first electrodes may have a shape of diamond patterns that are connected by connection patterns, and the first electrodes may be repeatedly arranged with a period between each pair of the first electrodes.

The second electrodes may have a shape of diamond patterns that are connected by connection patterns, and the second electrodes may be repeatedly arranged at a period between each pair of the second electrodes.

The diamond patterns of the first electrodes and the diamond patterns of the second electrodes may be disposed on a surface of the display panel, and the insulating layer may be disposed between the connection patterns of the first electrodes and the connection patterns of the second electrodes crossing the connection patterns of the first electrodes.

The electronic device may further include first connection electrodes connecting ends of some of adjacent first electrodes among the electrodes, the first connection electrodes being repeatedly arranged.

The first connection electrodes may face an outer area of a display surface of the display panel.

A number of the first electrodes connected to one among the first connection electrodes may be equal to a number of the first electrodes between each pair of the first connection electrodes.

The electronic device may further include second connection electrodes connecting ends of some of adjacent second electrodes among the second electrodes, the second connection electrodes being repeatedly arranged.

The second connection electrodes may face an outer area of a display surface of the display panel.

A number of the second electrodes connected to one among the second connection electrodes may be equal to a number of the second electrodes between each pair of the second connection electrodes.

The controller may be further configured to, when the electronic device is in a fingerprint sensing mode, transmit the driving signals to the respective first electrodes not connected to the first connection electrodes such that separate channels are formed, and receive the electrical signals from the respective second electrodes not connected to the second connection electrodes.

The controller may be further configured to, when the electronic device is in a touch sensing mode, transmit a same driving signal to the first electrodes between the first connection electrodes such that a single channel is formed, and sum and receive a same electrical signal from the second electrodes between the second connection electrodes.

The first electrodes may include first touch-fingerprint electrodes, each of the first-touch-fingerprint electrodes having a first width, and first touch electrodes, each of the first touch electrodes having a second width greater than the first width, and the second electrodes may include second touch-fingerprint electrodes, each of the second touch-fingerprint electrodes having a third width, and second touch electrodes, each of the second touch electrodes having a fourth width greater than the third width.

The first width may be approximately equal to the third width, and the second width may be approximately equal to the fourth width.

A constant number of the first electrodes may be disposed between each pair of the first touch electrodes, and a constant number of the second electrodes may be disposed between each pair of the second touch electrodes.

The controller may be further configured to, when the electronic device is in a fingerprint sensing mode, transmit the driving signals to the respective first touch-fingerprint electrodes such that separate channels are formed, and receive the electrical signals from the respective second touch-fingerprint electrodes.

The controller may be further configured to, when the electronic device is in a touch sensing mode, transmit a same driving signal to the first touch-fingerprint electrodes between the first touch electrodes such that a single channel is formed, and sum and receive a same electrical signal from the second touch-fingerprint electrodes between the second touch electrodes.

A thickness of the protection film may be less than about 100 μm.

The display panel may include a display element configured to display the image, and a cover layer configured to protect the display element.

The display panel may be a liquid crystal display panel or an organic light emitting display panel.

The electronic device may be a portable mobile communication device.

BRIEF DESCRIPTION OF THE DRAWINGS

The above and/or other aspects will be more apparent by describing exemplary embodiments with reference to the accompanying drawings, in which.

DETAILED DESCRIPTION

Figure 1:
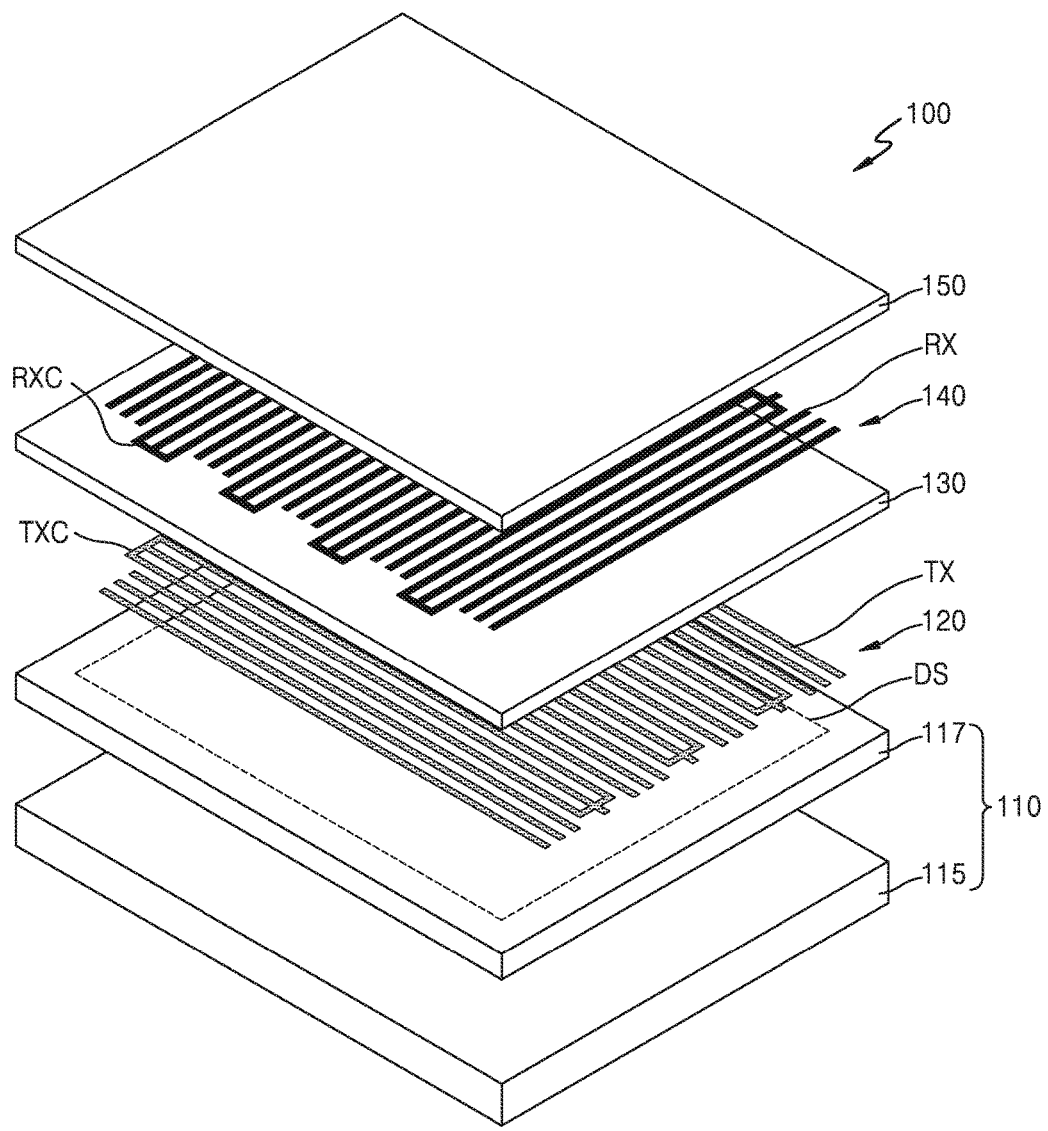
FIG. 1 is an exploded perspective view of a schematic configuration of a touch-fingerprint complex sensor according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail. As used herein, the term "and/or" includes any and all combinations of one or more of the associated listed items. Expressions such as "at least one of," when preceding a list of elements, modify the entire list of elements and do not modify the individual elements of the list.

It will be understood that when a component, such as a layer, a film, a region, or a plate, is referred to as being "on" another component, the component can be directly on the other component or intervening components may be present thereon.

While such terms as "first," "second," etc., may be used to describe various components, such components may not be limited to the above terms. The above terms are used only to distinguish one component from another.

An expression used in the singular encompasses the expression of the plural, unless it has a clearly different meaning in the context. It will be understood that the terms "comprises" and/or "comprising" used herein specify the presence of stated features or components, but do not preclude the presence or addition of one or more other features or components.

In addition, the terms such as "unit," "-er (-or)," and "module" described in the specification refer to an element for performing at least one function or operation, and may be implemented in hardware, software, or the combination of hardware and software.

Figure 2:
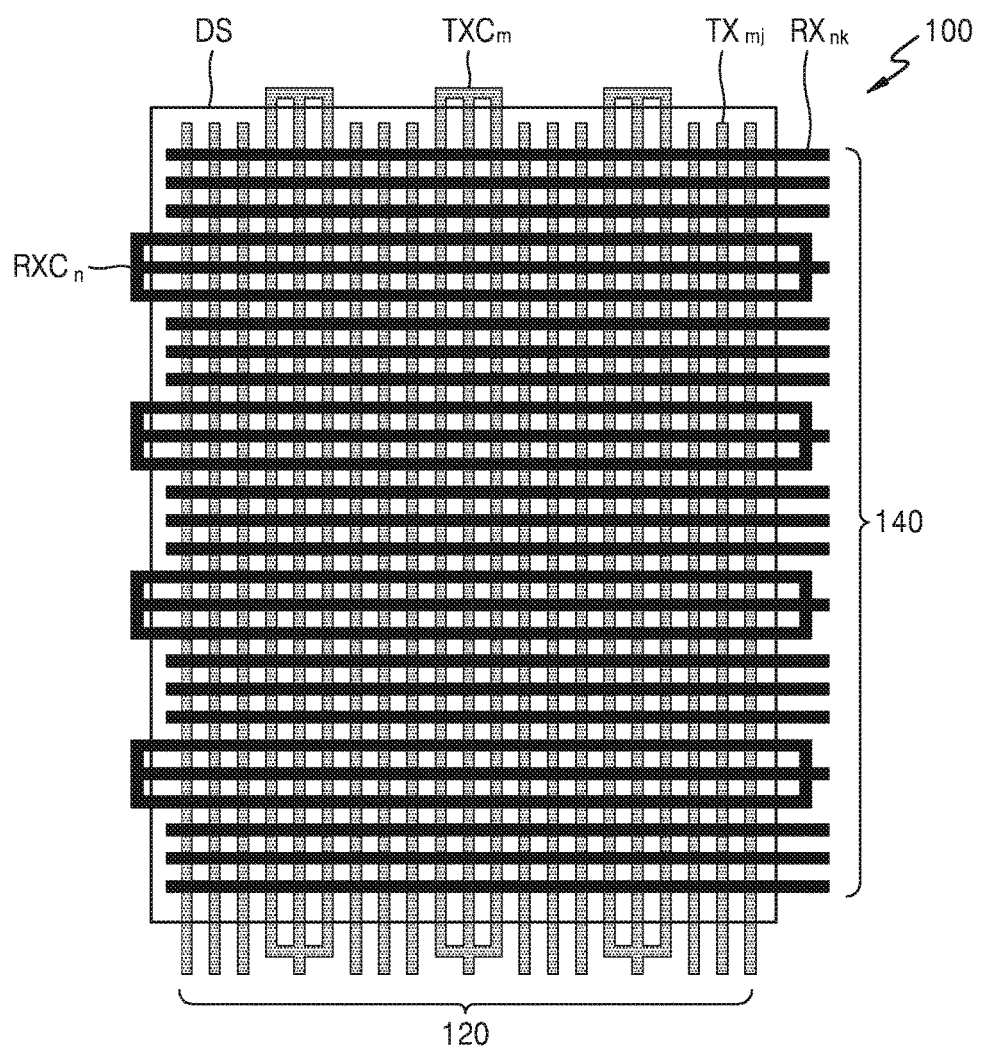
FIG. 2 is a plan view of a detailed layout of a driving electrode portion and a detection electrode portion on a display surface of a display panel in the touch-fingerprint complex sensor of FIG. 1, according to an exemplary embodiment.
Figure 3:
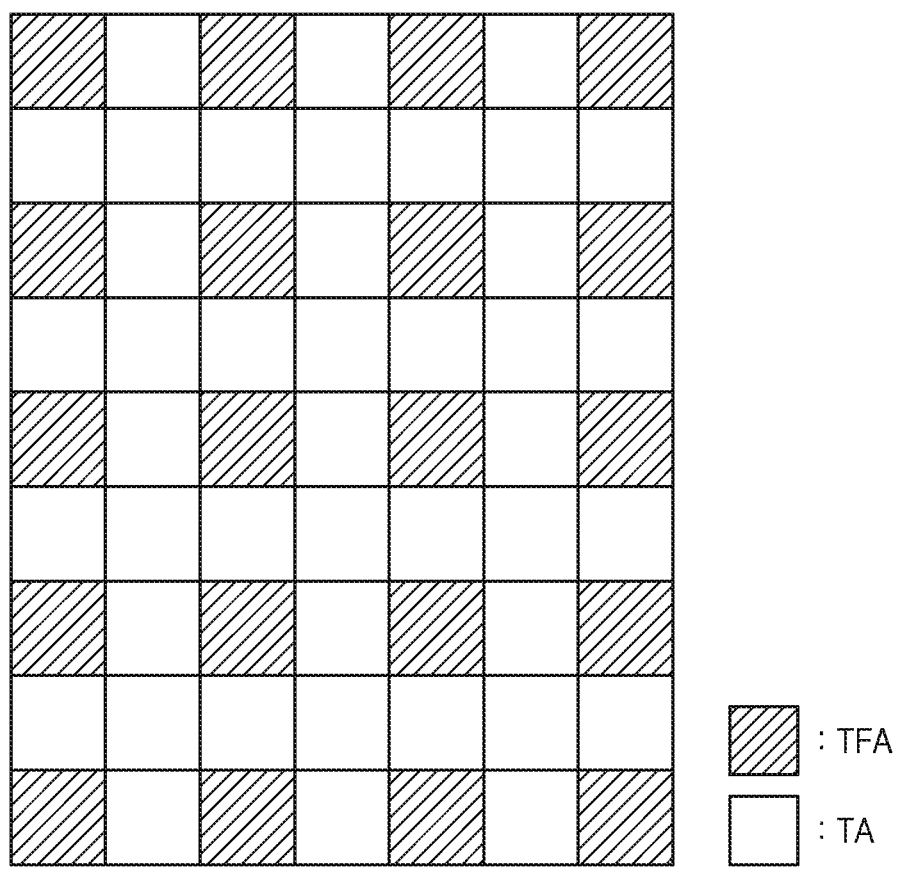
FIG. 3 is a plan view of a layout of touch-fingerprint detection areas and touch detection areas on the display surface of the display panel in the touch-fingerprint complex sensor of FIG. 1, according to an exemplary embodiment.

FIG. 1 is an exploded perspective view of a schematic configuration of a touch-fingerprint complex sensor 100 according to an exemplary embodiment. FIG. 2 is a plan view of a detailed layout of a driving electrode portion 120 and a detection electrode portion 140 on a display surface DS of a display panel 110 in the touch-fingerprint complex sensor 100 of FIG. 1. FIG. 3 is a plan view of touch-fingerprint detection areas TFA and touch detection areas TA on the display surface DS of the display panel 110 in the touch-fingerprint complex sensor 100 of FIG. 1.

Referring to FIG. 1, the touch-fingerprint complex sensor 100 includes the display panel 110 having the display surface DS that displays an image, and the driving electrode portion 120 and the detection electrode portion 140 that are disposed on the display panel 110 and are spaced apart from each other. The driving electrode portion 120 includes a plurality of first electrodes TX arranged in parallel in a direction, and the detection electrode portion 140 includes a plurality of second electrodes RX arranged in parallel in a direction crossing the direction of the first electrodes TX. The crossing direction may be an orthogonal direction to the direction of the first electrodes TX. An insulating layer 130 is disposed between the driving electrode portion 120 and the detection electrode portion 140. A protection film 150 is further disposed on the detection electrode portion 140.

The touch-fingerprint complex sensor 100 may be a capacitive type sensor and may sense a capacitance variation by a user touch or a detailed shape of a touched fingerprint. A plurality of nodes in which the plurality of first electrodes TX and the plurality of second electrodes RX cross each other may function as a pixel that senses a touch input or a fingerprint input. That is, a self-capacitance change or a mutual capacitance change may occur due to the touch input or the fingerprint input in the plurality of nodes where the plurality of first electrodes TX and the plurality of second electrodes RX cross each other, and a coordinate of the touch input or an image of a touched fingerprint may be calculated based on a capacitance variation of a plurality of touched nodes.

A plurality of areas in which plurality of first electrodes TX and the plurality of second electrodes RX cross each other may be defined as the touch-fingerprint detection areas TFA or the touch detection areas TA in which both touches and fingerprints are detected. The touch-fingerprint detection areas TFA and the touch detection areas TA may be disposed on the display surface DS in a matrix shape. Here, the display surface DS indicates an effective area on which images are displayed. That is, among areas on the display panel, on an outer area of the display surface DS, images are not displayed. The touch-fingerprint detection areas TFA may be distributed on the display surface DS according to a predetermined rule. The touch-fingerprint detection areas TFA may be areas in which the both touches and fingerprints are detected, and thus an entire area of the display surface DS may be an area in which touches are detected. Thus, the touch-fingerprint detection areas TFA may be referred as the touch detection areas TA when the touch-fingerprint detection areas TFA operates as areas in which touches are detected.

According to the layout of the touch-fingerprint detection areas TFA and the touch detection areas TA, the touch-fingerprint detection areas TFA is not limited, the user convenience is increased, and also the touch-fingerprint complex sensor 100 may operate at a relatively high resolution when fingerprints are detected.

Referring to FIG. 2, subscripts m, j, n, and k of a first electrode $TX_{mj}$ and a second electrode $RX_{nk}$ are determined according to positions of the first electrodes TX and the second electrodes RX. When the layout of the touch detection areas TA has a shape of an M×N matrix, m is a natural number from 1 to M, and n is a natural number from 1 to N. When the plurality of first electrodes TX connected to first connection electrodes TXC and the plurality of first electrodes TX disposed between the first connection electrodes TXC that are adjacent to each other are classified into groups, M may be the number of the groups disposed in a direction in which the first electrodes TX are repeatedly arranged. When the plurality of second electrodes RX connected to second connection electrodes RXC and the plurality of second electrodes RX disposed between the second connection electrodes RXC that are adjacent to each other are classified into groups, N may be the number of the groups disposed in a direction in which second electrodes RX are repeatedly arranged.

When fingerprint detection pixels provided in the single touch detection area TA has a shape of a J×K matrix, j is a natural number from 1 to J, and k is a natural number from 1 to K. J and K are respectively the number of the first electrodes TX disposed between the first connection electrodes TXC that are adjacent to each other and the number of the second electrodes RX disposed between the second connection electrodes RXC that are adjacent to each other.

Lower subscripts of the reference numerals of the first electrodes TX and the second electrodes RX may be used when a layout position is specified as described below.

More detailed shapes of the first electrodes TX and the second electrodes RX, examples of forming the touch detection areas TA and the touch-fingerprint detection area TFA from the shapes of first electrodes TX and the second electrodes RX, and an operation of detecting touches or fingerprints will be described later with reference to FIGS. 4 through 6.

Referring again to FIG. 1, the display panel 110 may be, for example, an organic light emitting display panel or a liquid crystal display panel, and includes a display element 115 forming an image and a cover layer 117 protecting the display element 115. The cover layer 117 may be formed of a glass material or a transparent plastic material. A predetermined area on the cover layer 117 is the display surface DS that displays the image.

The driving electrode 120 includes the plurality of first electrodes TX to which driving signals for sensing are applied. The detection electrode portion 140 includes the plurality of second electrodes RX for detecting electrical signals. In this regard, applying driving signals for sensing to the plurality of first electrodes TX and detecting electrical signals from the plurality of second electrodes RX are examples. Driving signals may be applied to the plurality of second electrodes RX, and electrical signals may be detected from the plurality of first electrodes TX.

The first electrodes TX and the second electrodes RX, as shown, may be in a strip shape having uniform widths. The widths and arrangement periods of the plurality of first electrodes TX may be constant. The widths and repeatedly arranged periods of the plurality of second electrodes RX may be constant. The widths of the plurality of first electrodes TX and the widths of the plurality of second electrodes RX may be the same. The repeatedly arranged periods of the plurality of first electrodes TX and the repeatedly arranged periods of the plurality of second electrodes RX may also be the same. However, the exemplary embodiments are not limited thereto. The widths and the repeatedly arranged periods of the first electrodes TX and the plurality of second electrodes RX may be variously determined to have regular patterns such that visibility of the image displayed on the display surface DS may not be influenced as possible. The first electrodes TX and the second electrodes RX may be formed of a transparent conductive material that does not have 100% of light transmittance, and thus the transparent conductive material is likely to influence the visibility of the image displayed on the display image DS. The more regular the layout pattern of the first electrodes TX and the second electrodes RX, the less visible the first electrodes TX and the second electrodes RX, and thus the image displayed on the display image DS may be less affected.

Both ends of some of the plurality of first electrodes TX that are adjacent to each other are connected via the first connection electrodes TXC that are repeatedly disposed according to a predetermined rule. According to an exemplary embodiment, as shown in FIGS. 1 and 2, three of the adjacent first electrodes TX may be connected to each other, the following three adjacent first electrodes TX may not be connected to, and next three of the adjacent first electrodes TX may be connected. However, this is an example. The first connection electrodes TXC may be formed to connect a different number of the first electrodes TX, and the number of the first electrodes TX that are not connected may be changed.

Both ends of some of the plurality of second electrodes RX that are adjacent to each other are connected via the second connection electrodes RXC that are repeatedly disposed according to a predetermined rule. For example, as shown, three of the adjacent second electrodes RX may be connected, next three of the adjacent second electrodes RX may not be connected, and next three of the adjacent second electrodes RX may be connected. However, this is an example. The second connection electrodes RXC may be formed by connecting a different number of the second electrodes RX may be connected, and the number of the second electrodes RX that are not connected may be changed.

The first connection electrodes TXC and the second connection electrodes RXC are disposed on the display panel 110 to face an outer area of the display surface DS, to increase uniformity of electrode patterns formed on the display surface DS. As described above, the first connection electrodes TXC and the second connection electrodes RXC may be formed of the transparent conductive material that does not have 100% of light transmittance, and thus the transparent conductive material is likely to influence the visibility of the image displayed on the display image DS. The more uniform the electrode patterns, the lower the influence on the visibility of the image displayed on the display image DS. Thus, the first connection electrodes TXC and the second connection electrodes RXC that break the regularity of the electrode patterns may be disposed outside the display surface DS, thereby minimizing deterioration of the visibility of the image due to the driving electrode portion 120 and the detection electrode portion 140 for sensing touches or fingerprints.

The plurality of first electrodes TX connected via the first connection electrodes TXC may operate as a single electrode that will be referred to as a first touch electrode below. A driving signal for sensing a touch may be applied to the first touch electrode and may not be applied to the first touch electrode when a fingerprint is sensed. The plurality of second electrodes RX connected via the second connection electrodes RXC may also operate as a single electrode that will be referred to as a second touch electrode below. The second touch electrode may be an electrode detecting an electrical signal. No electrical signal may be detected from the second touch electrode when the fingerprint is sensed.

An area in which the first touch electrode and the second touch electrode may form a pixel greater than pixels of areas in which the first electrodes TX and the second electrodes RX, other than touch electrodes, cross each other, in other words, areas in which the first electrodes TX and the second electrodes RX that are not connected to the first connection electrodes TXC or the second connection electrodes RXC cross each other. The area may be the touch detection area TA having a single pixel.

The areas in which the first electrodes TX and the second electrodes RX, other than touch electrodes, cross each other, in other words, areas in which the first electrodes TX and the second electrodes RX that are not connected to the first connection electrodes TXC or the second connection electrodes RXC cross each other, may be the touch-fingerprint detection areas TFA. The plurality of touch-fingerprint detection areas TFA may be distributed according to a predetermined rule based on the rule used to form the first connection electrodes TXC and the second connection electrodes RXC. A single touch-fingerprint detection area TFA may include a plurality of nodes, i.e., a plurality of pixels. A number of pixels forming the single touch-fingerprint detection area TFA may be a multiplication of the number of the first electrodes TX between the adjacent first connection electrodes TXC and the number of the second electrodes RX between the adjacent second connection electrodes RXC. Nine pixels of 3×3 are shown in the figures, but this is an example and is not limited thereto.

Areas in which the first touch electrode and the second electrodes RX that are not touch electrodes cross each other, in other words, areas in which the first electrodes TX connected to the first connection electrodes TXC and the second electrodes RX that are not connected to the second connection electrodes RXC cross each other, may form the touch detection area TA. The above-formed touch detection area TA may include a plurality of nodes and form a plurality of pixels. The number of pixels may be determined the number of the second electrodes RX between the adjacent second connection electrodes RXC and is 3 according to the drawings but is not limited thereto. The touch detection area TA may sum and output electrical signals of the second electrodes RX that are not connected to the second connection electrode RXC when operating in a touch sensing mode, thereby operating as the single pixel.

Areas in which the first electrodes TX that are not touch electrodes and the second touch electrodes TX cross each other, in other words, areas in which the first electrodes TX that are not connected to the first connection electrodes TXC and the second electrodes RX connected to the second connection electrodes RXC cross each other, may form the plurality of touch detection areas TA. Each of the above-formed touch detection areas TA may include a plurality of nodes. That is, a single touch detection area TA may include a plurality of pixels. The number of pixels may be determined the number of the first electrodes TX between the adjacent first connection electrodes TXC and is 3 according to the drawings but is not limited thereto. The touch detection areas TA may apply the same driving signal to the first electrodes TX that are not connected to the first connection electrodes TXC when operating in the touch sensing mode, thereby operating as the single pixel.

Referring to FIG. 3, as described above, the touch detection areas TA and the touch-fingerprint detection areas TFA may be defined by the areas in which the plurality of first electrodes TX and the plurality of second electrodes RX cross each other according to shapes of the driving electrode portion 120 and the detection electrode portion 140 shown in FIGS. 1 and 2.

The touch-fingerprint detection areas TFA may be used as areas detecting touches and fingerprints and may be areas in which the first electrodes TX that are not connected to the first connection electrodes TXC and the second electrodes RX that are not connected to the second connection electrodes RXC cross each other.

The touch-fingerprint detection areas TFA also are the areas detecting touches, and thus an entire area of the display surface DS may be the touch detection area TA. When the touch detection area TA is disposed in a shape of an M×N matrix, the touch-fingerprint detection areas TFA may be formed in positions in which (row, column) are expressed as (odd, odd) in the matrix. That is, in a 9×7 matrix, the touch-fingerprint detection areas TFA may be disposed in (1, 1), (1, 3), . . . , (3, 1), (3, 3), . . . , (9, 1), (9, 3), . . . and (9, 7).

The touch-fingerprint detection areas TFA of FIG. 3 may be determined according to positions of the first connection electrodes TXC and the second connection electrode RXC shown in FIGS. 1 and 2. The positions of the first connection electrodes TXC and the second connection electrode RXC may be modified. For example, the touch-fingerprint detection areas TFA may be formed in positions in which (row, column) are expressed as one rule of (odd, even), (even, even), and (even odd) in the matrix.

Figure 4:
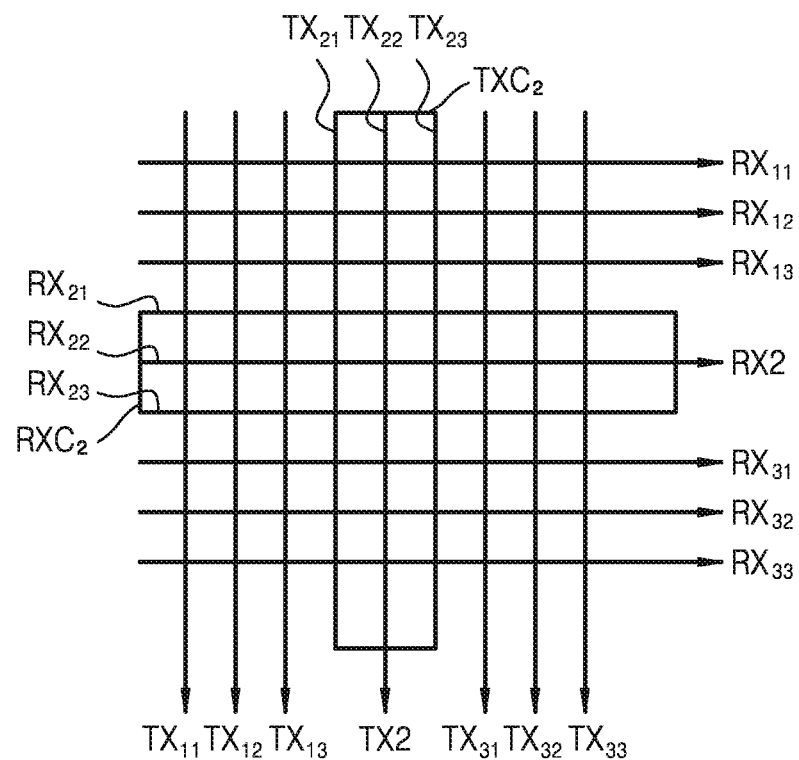
FIG. 4 is a detailed plan view of shapes of electrodes by simplifying a matrix of FIG. 3 as a 3×3 matrix according to an exemplary embodiment.

FIG. 4 is a detailed plan view of shapes of electrodes by simplifying a matrix of FIG. 3 as a 3×3 matrix. FIGS. 5 and 6 are plans views of layout shapes of the touch-fingerprint detection areas TFA and the touch detection areas TA in the plan view of FIG. 4.

The first electrodes TX are displayed in the order of $TX_{11}$, $TX_{12}$, $TX_{13}$, $TX_{21}$, $TX_{22}$, $TX_{23}$, $TX_{31}$, $TX_{32}$, and $TX_{33}$ from the left. That is, when the plurality of first electrodes TX connected to first connection electrodes $TXC_m$ and the plurality of first electrodes TX that are disposed between the adjacent first connection electrodes TXC and are not connected to the first connection electrode $TXC_m$, are classified into groups, m of $TX_{mj}$ of FIG. 2 may denote an order of the groups disposed from the left. j may denote an order of the plurality of first electrodes TX that are disposed between the first connection electrodes $TXC_m$ that are adjacent to each other and are not connected to the first connection electrodes $TXC_m$ in the groups from the left. The first electrodes $TX_{21}$, $TX_{22}$, and $TX_{23}$ that are connected to each other by a first connection electrode $TXC_2$ may operate as the same one electrode. The electrode is referred to as a first touch electrode TX2. The first electrodes $TX_{11}$, $TX_{12}$, $TX_{13}$, $TX_{31}$, $TX_{32}$, and $TX_{33}$ that are not connected to the first connection electrode $TXC_2$ and thus are applied separate driving signals may be referred to as first touch-fingerprint electrodes below.

The second electrodes RX are displayed in the order of $RX_{11}$, $RX_{12}$, $RX_{13}$, $RX_{21}$, $RX_{22}$, $RX_{23}$, $RX_{31}$, $RX_{32}$, and $RX_{33}$ from the top. That is, when the plurality of second electrodes RX connected to second connection electrodes $RXC_n$ and the plurality of second electrodes RX that are disposed between the adjacent second connection electrodes RXC and are not connected to the second connection electrodes $RXC_n$, are classified into groups, n of $RX_{nk}$ of FIG. 2 may denote an order of the groups disposed from the top. k may denote an order of the plurality of second electrodes RX that are disposed between the second connection electrodes $RXC_n$ that are adjacent to each other and are not connected to the second connection electrodes $RXC_n$ in the groups from the top. The second electrodes $RX_{21}$, $RX_{22}$, and $RX_{23}$ that are connected to each other by a second connection electrode $RXC_2$ may operate as the same one electrode. The electrode is referred to a second touch electrode RX2. The second electrodes $RX_{11}$, $RX_{12}$, $RX_{13}$, $RX_{31}$, $RX_{32}$, and $RX_{33}$ that are not connected to the second connection electrode $RXC_2$ and thus detect separate electrical signals may be referred to as second touch-fingerprint electrodes below because the second electrodes $RX_{11}$, $RX_{12}$, $RX_{13}$, $RX_{31}$, $RX_{32}$, and $RX_3$ are not connected to the second connection electrode $RXC_2$.

Figure 5:
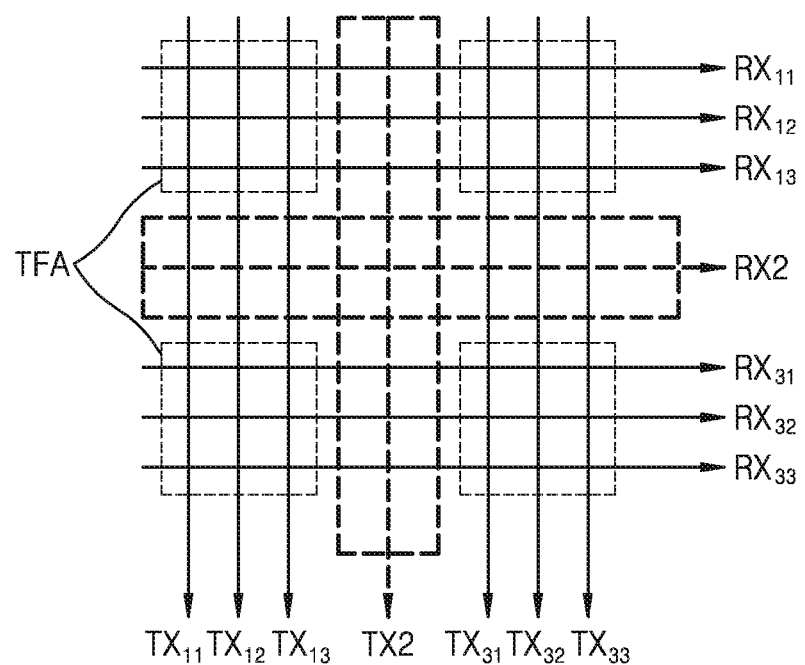
FIG. 5 is a plan view of a layout shape of touch-fingerprint detection areas in the plan view of FIG. 4 according to an exemplary embodiment.

Referring to FIG. 5, the touch-fingerprint detection areas TFA may include 9 pixels as shown.

When the touch-fingerprint complex sensor 100 senses a fingerprint, driving signals may be independently applied to the first touch-fingerprint electrode, i.e., the first electrodes $TX_{11}$, $TX_{12}$, $TX_{13}$, $TX_{23}$, $TX_{31}$, $TX_{32}$, and $TX_{33}$ that are not connected to the first connection electrode $TXC_2$ such that separate channels are formed. Electrical signals may be separately detected from the second touch-fingerprint electrode, i.e., the second electrodes $RX_{11}$, $RX_{12}$, $RX_{13}$, $RX_{23}$, $RX_{31}$, $RX_{32}$, and $RX_3$ that are not connected to the second connection electrode $RXC_2$. No driving signal may be applied to the first touch electrode TX2, and thus no signal may be detected from the second touch electrode RX2 corresponding to the plurality of second electrodes RX connected to the second connection electrode $RXC_2$.

Figure 6:
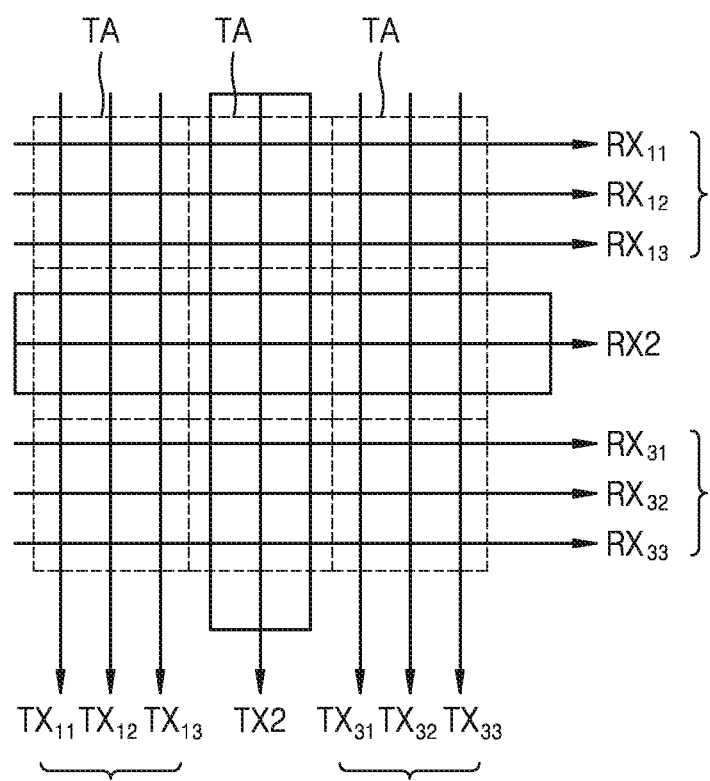
FIG. 6 is a plan view of a layout shape of touch detection areas in the plan view of FIG. 4 according to an exemplary embodiment.

Referring to FIG. 6, when the touch-fingerprint complex sensor 100 senses a touch, a driving signal may be applied to the first touch electrode TX2. The same driving signal may be applied to the first touch-fingerprint electrode forming the same touch detection area TA such that a single channel is formed. That is, the same driving signal may be applied to the first touch-fingerprint electrodes $TX_{11}$, $TX_{12}$, and $TX_{13}$, and the same driving signal may be applied to the first touch-fingerprint electrodes $TX_{31}$, $TX_{32}$, and $TX_{33}$.

An electrical signal may be detected from the second touch electrode RX2. Among the second electrodes $RX_{11}$, $RX_{12}$, $RX_{13}$, $RX_{31}$, $RX_{32}$, and $RX_{33}$ that are not connected to the second connection electrodes RXC, signals of the second touch-fingerprint electrodes forming the same touch detection areas TA may be summed and detected. That is, signals of the second touch-fingerprint electrodes $RX_{11}$, $RX_{12}$, and $RX_{13}$ may be summed and detected, and signals of the second touch-fingerprint electrodes $RX_{31}$, $RX_{32}$, and $RX_{33}$ may be summed and detected.

An entire area of the display surface DS may be a touch detectable area. Although an example in which a single touch detection area operates as a single touch detection pixel is described above, the single touch detection area may operate as a plurality of pixels.

Figure 7:
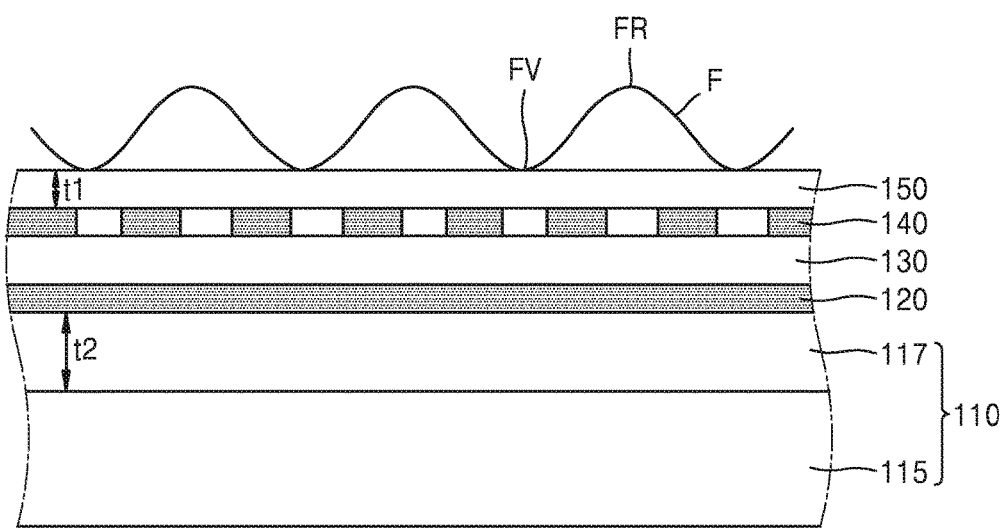
FIG. 7 is a cross-sectional view of a touch-fingerprint complex sensor touched by a user's fingerprint, according to an exemplary embodiment.

FIG. 7 a cross-sectional view of the touch-fingerprint complex sensor 100 touched by a user's fingerprint, according to an exemplary embodiment.

If a driving signal is applied to the driving electrode portion 120, mutual capacitance may be generated between the driving electrode portion 120 to which the driving signal is applied and the detection electrode portion 140. If a finger F touches the protection film 150, a variation in the mutual capacitance generated between the driving electrode portion 120 and electrodes adjacent to an area contacting the finger F among a plurality of electrodes included in the detection electrode portion 140 may occur. The variation in the mutual capacitance may be different in electrodes adjacent to ridges FR indicating a fingerprint of the finger F and electrodes adjacent to valleys FV. Gaps between ridges and valleys of the finger F may be usually smaller than gaps between the electrodes included in the detection electrode portion 140, and thus the variation in the mutual capacitance due to the finger F adjacent to the detection electrode portion 140 may be detected for each position to calculate a fingerprint image.

According to the touch-fingerprint complex sensor 100 of the exemplary embodiments, the driving electrode portion 120 and the detection electrode portion 140 are disposed on the display panel 110, and the protection film 150 having a thickness t1 relatively smaller than a thickness t2 of the cover layer 117 of the display panel 110 is disposed on the detection electrode portion 140. The thickness t1 of the protection film 150 may be below about 100 μm, for example, about 50 μm. Such a layout is to improve fingerprint recognition sensitivity by increasing a capacitance variation due to a fingerprint touch. The closer the distance between an area touched by the finger F, the driving electrode portion 120, and the detection electrode portion 140, the higher the fingerprint recognition sensitivity.

Figure 8:
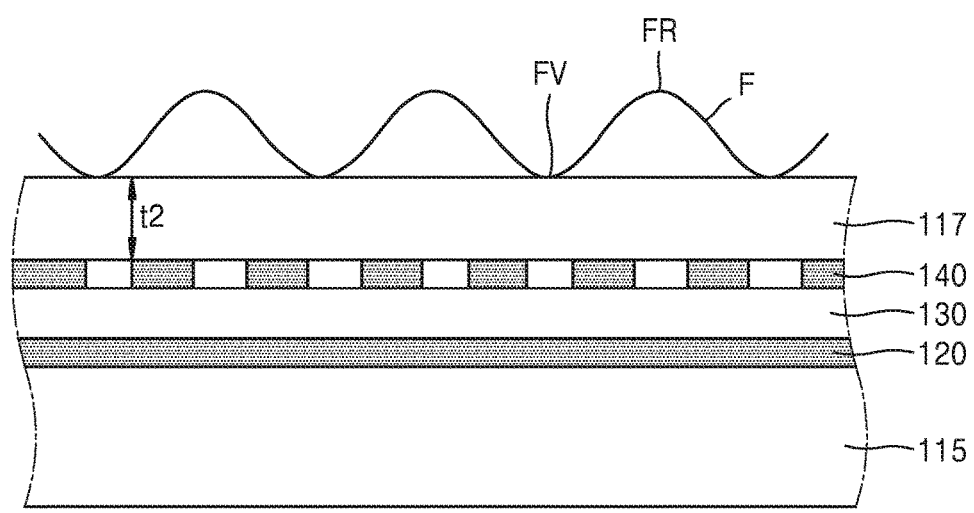
FIG. 8 is a cross-sectional view of a touch-fingerprint complex sensor touched by a user's fingerprint, according to a comparison example.

FIG. 8 is a cross-sectional view of a touch-fingerprint complex sensor touched by a user's fingerprint, according to a comparison example.

The touch-fingerprint complex sensor according to the comparison example includes the driving electrode portion 120 and the detection electrode portion 140 between the display element 115 and the cover layer 117. A thickness t2 of the cover layer 117 may be usually several hundreds μm, for example, about 400 μm. When the finger F touches the cover layer 117, because a distance between the finger F, the driving electrode portion 120, and the detection electrode portion 140 is greater than that of the exemplary embodiments, fingerprint recognition sensitivity may be reduced.

Figure 9:
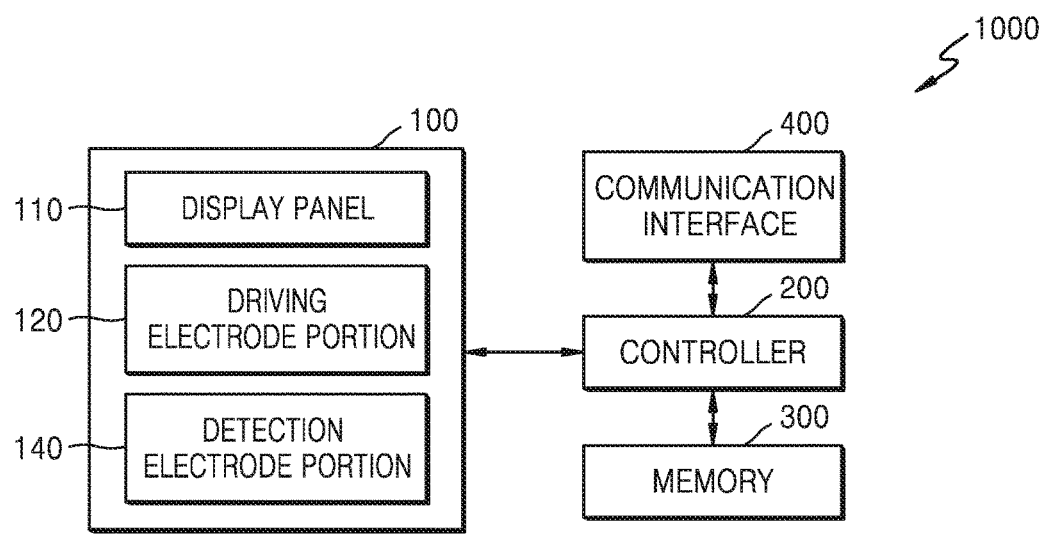
FIG. 9 is a block diagram of a schematic configuration of an electronic device according to an exemplary embodiment.

FIG. 9 is a block diagram of a schematic configuration of an electronic device 1000 according to an exemplary embodiment.

The electronic device 1000 includes the touch-fingerprint complex sensor 100 and a controller 200 controlling the touch-fingerprint complex sensor 100.

The touch-fingerprint complex sensor 100 includes the display panel 110, the driving electrode portion 120, and the detection electrode portion 140, and may have the above-described configuration.

The controller 200 may control the touch-fingerprint complex sensor 100 to apply a driving signal to the driving electrode portion and detect an electrical signal from the detection electrode portion. The controller 200 may differentiate a fingerprint sensing mode and a touch sensing mode to apply the driving signal to the driving electrode portion and detect the electrical signal from the detection electrode portion. For example, in the fingerprint sensing mode, as described with reference to FIG. 5 above, the controller 200 may control the touch-fingerprint complex sensor 100 to apply separate driving signals to the first electrodes $TX_{11}$, $TX_{12}$, $TX_{13}$, $TX_{31}$, $TX_{32}$, and $TX_{33}$ that are not connected to the first connection electrode $TXC_2$, and detect the electrical signal from each of the second electrodes $RX_{11}$, $RX_{12}$, $RX_{13}$, $RX_{31}$, $RX_{32}$, and $RX_{33}$ that are not connected to the second connection electrode $RXC_2$. In the touch sensing mode, as described with reference to FIG. 6 above, the controller 200 may control the touch-fingerprint complex sensor 100 to apply the driving signal to the first touch electrode TX2 and apply the same driving signal to the first electrodes $TX_{11}$, $TX_{12}$, and $TX_{13}$ forming the same touch detection area TA. The controller 200 may control the touch-fingerprint complex sensor 100 to detect the electrical signal from the second touch electrode RX2 and sum and detect the electrical signals of the second electrodes $RX_{11}$, $RX_{12}$, and $RX_{13}$ forming the same touch detection area TA.

The controller 200 may also determine the fingerprint sensing mode or the touch sensing mode to calculate a fingerprint image and determine authentication through fingerprint matching in the fingerprint sensing mode and calculate a touched coordinate, and perform a command corresponding to a position of the calculated coordinate.

The electronic device 1000 further includes a memory 300 and a communication interface 400.

The memory 300 may store programs for processing of control of the controller 200. The memory 300 may store a control program applying the driving signal to the touch-fingerprint complex sensor 100 and analyzing a detection signal, and additionally previously stored fingerprint data for user authentication or a matching program for fingerprint matching, etc.

The memory 300 may include at least one type of storage medium among flash memory type memory, hard disk type memory, multimedia card micro type memory, card type memory (e.g. SD or XD memory), RAM (Random Access Memory) SRAM (Static Random Access Memory), ROM (Read-Only Memory), EEPROM (Electrically Erasable Programmable Read-Only Memory), PROM (Programmable Read-Only Memory), magnetic memory, a magnetic disk, and an optical disk.

The communication interface 400 may communicate with an external device by using Bluetooth communication, BLE (Bluetooth Low Energy) communication, Near Field Communication (NFC), WLAN (Wi-Fi) communication, Zigbee communication, IrDA (infrared Data Association) communication, WFD (Wi-Fi Direct) communication, UWB (ultra wideband) communication, and Ant+ communication WIFI but is not limited thereto.

The electronic device 1000 may be, for example, a portable mobile communication device or a smart phone.

Figure 10:
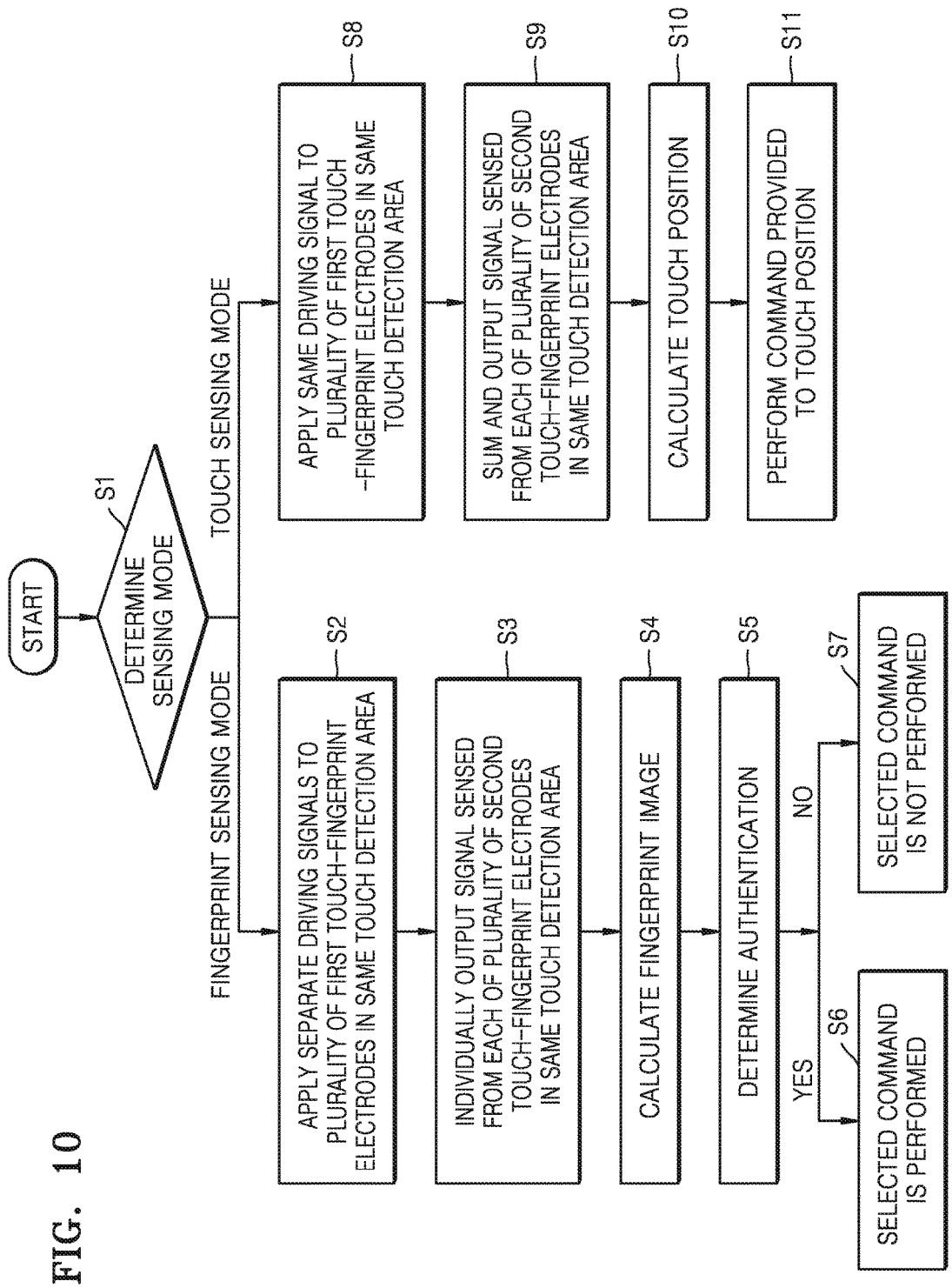
FIG. 10 is a flowchart of a process in which the electronic device of FIG. 9 performs touch sensing and fingerprint sensing, according to an exemplary embodiment.

FIG. 10 is a flowchart of a process in which the electronic device 1000 of FIG. 9 performs touch sensing and fingerprint sensing, according to an exemplary embodiment.

Referring to FIG. 10, in operation S1, the electronic device 1000 determines a sensing mode. That is, it may be determined whether a touch-fingerprint complex sensor operates in a fingerprint sensing mode or a touch sensing mode.

When the fingerprint sensing mode is determined, in operation S2, the electronic device 1000 applies separate driving signals to a plurality of first touch-fingerprint electrodes in the same touch detection area. In operation S3, the electronic device 1000 individually outputs a signal sensed from each of a plurality of second touch-fingerprint electrodes in the same touch detection area. In operation S4, the electronic device 1000 calculates a fingerprint image from the sensed signal. In operation S5, the electronic device 1000 determines authentication from the calculated fingerprint image. When the authentication is determined, in operation S6, the electronic device 1000 performs a selected command, and when the authentication is not determined, in operation S7, the electronic device 1000 does not perform the selected command.

When the touch sensing mode is determined, in operation S8, the electronic device 1000 applies the same driving signal to the plurality of first touch-fingerprint electrodes in the same touch detection area. In operation S9, the electronic device 1000 sums and outputs the signal sensed from each of the plurality of second touch-fingerprint electrodes in the same touch detection area. In operation S10, the electronic device 1000 calculates a touch position from the sensed signal. In operation S11, the electronic device 1000 performs a command provided to the touch position.

Figure 11:
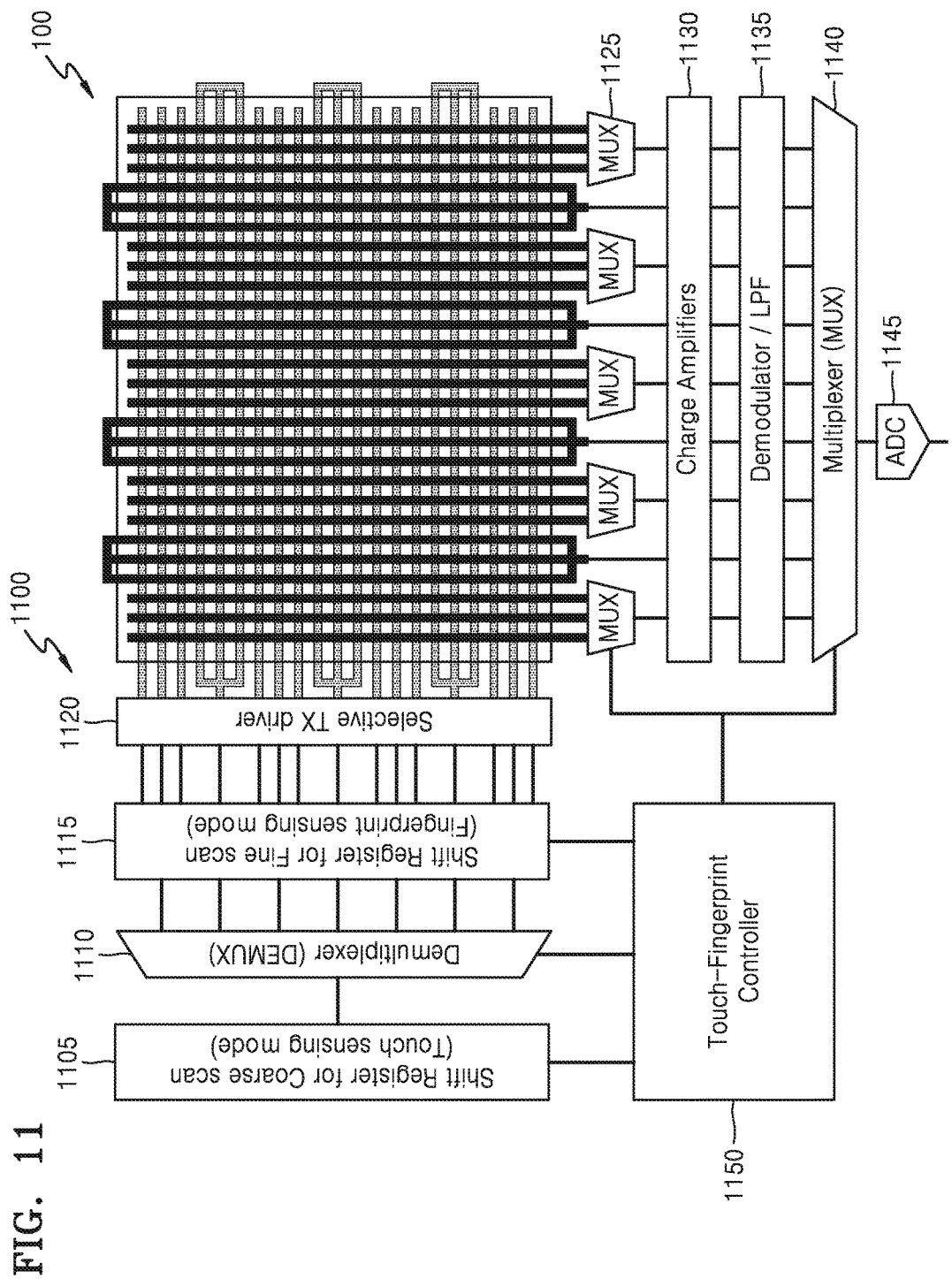
FIG. 11 is a diagram of a driving circuit of a touch-fingerprint complex sensor included in the electronic device of FIG. 9 according to an exemplary embodiment.

FIG. 11 is a diagram of a driving circuit 1100 of the touch-fingerprint complex sensor 100 included in the electronic device 1000 of FIG. 9.

Referring to FIG. 11, the driving circuit 1100 includes a shift register 1105 for touch sensing mode coarse scan, a demultiplexer 1110 (DEMUX) for distributing an output of a touch shift register to a TX driver, a shift register 1115 for fingerprint sensing mode fine scan, and the TX driver 1120 outputting a TX signal and applying the TX signal to the driving electrode portion 120.

The driving circuit 1100 further includes at least one multiplexer 1125 MUX selecting a line among output lines of the driving electrode portion 120, a signal amplification circuit end or charge amplifiers 1130, a demodulator or low frequency pass filter 1135 LPF, a multiplexer 1140 (MUX) selecting a line among output lines of the low frequency pass filter, and an analog-to-digital converter 1145 ADC converting analog signal into a digital signal. The driving circuit 1100 further includes a touch-fingerprint controller 1150 that controls one or more of the components of the driving circuit 1100.

Figure 12:
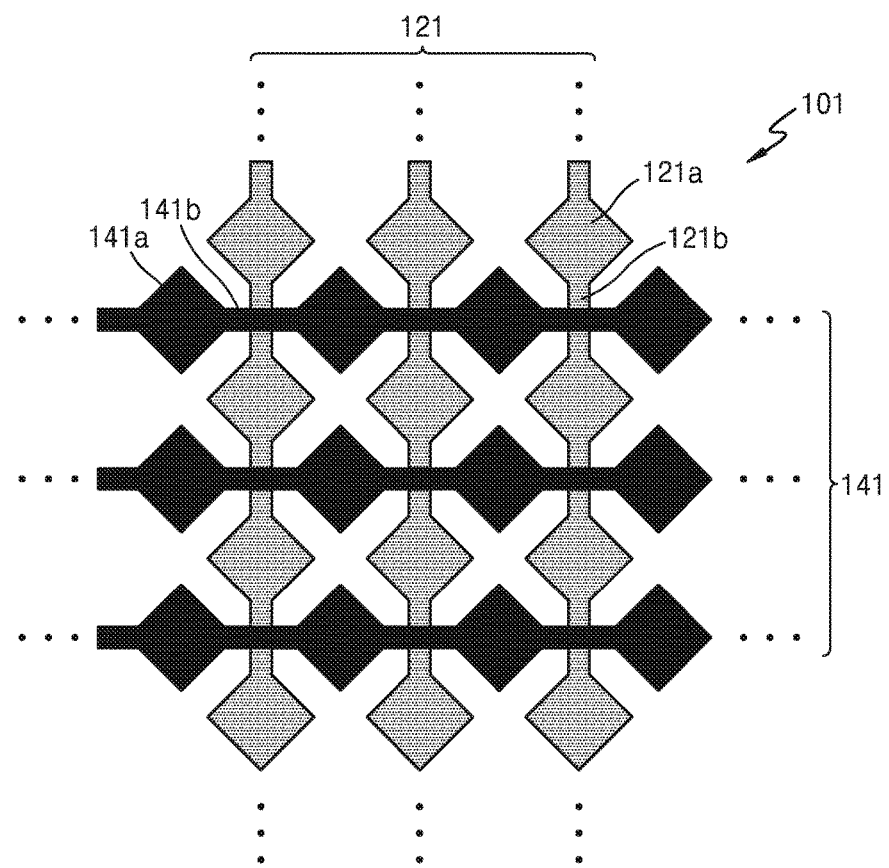
FIG. 12 is a plan view of shapes of driving electrodes and detection electrodes in a touch-fingerprint complex sensor according to another exemplary embodiment.
Figure 13:
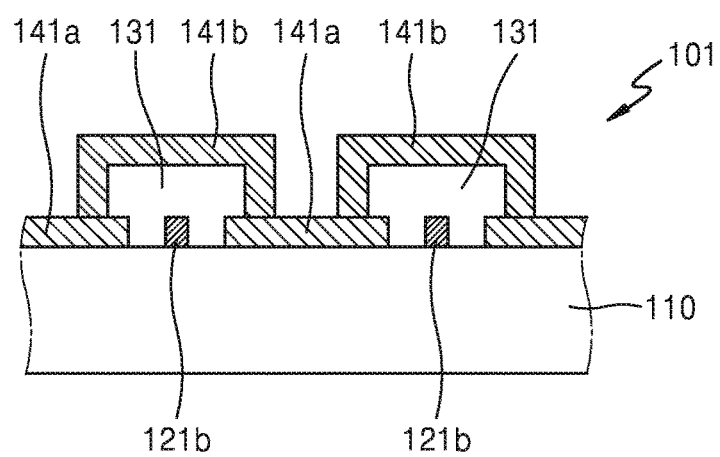
FIG. 13 is a cross-sectional view taken from a line A-A' of FIG. 12 according to an exemplary embodiment.

FIG. 12 is a plan view of shapes of driving electrodes and detection electrodes in a touch-fingerprint complex sensor 101 according to another exemplary embodiment. FIG. 13 is a cross-sectional view taken from a line A-A' of FIG. 12.

The touch-fingerprint complex sensor 101 is different from the above-described touch-fingerprint complex sensor 100 in shapes of first and second electrodes included in driving electrode portions 121 and detection electrode portions 141, and thus only a difference in the electrode shape is shown.

The electrodes of the driving electrode portions 121 have a shape of a plurality of diamond patterns 121a that are connected to each other, and include, for example, the diamond patterns 121a and first connection patterns 121b.

The electrodes of the detection electrode portions 141 have a shape of a plurality of diamond patterns 141a that are connected to each other, and include, for example, the diamond patterns 141a and second connection patterns 141b passing through the first connection patterns 121b in a bridge shape.

The diamond patterns 121a of the driving electrode portions 121 and the diamond patterns 141a of the detection electrode portions 141 may be formed on the same surface. Referring to FIG. 13, an insulating layer 131 insulates the first connection patterns 121b and the second connection patterns 141b from each other.

Figure 14:
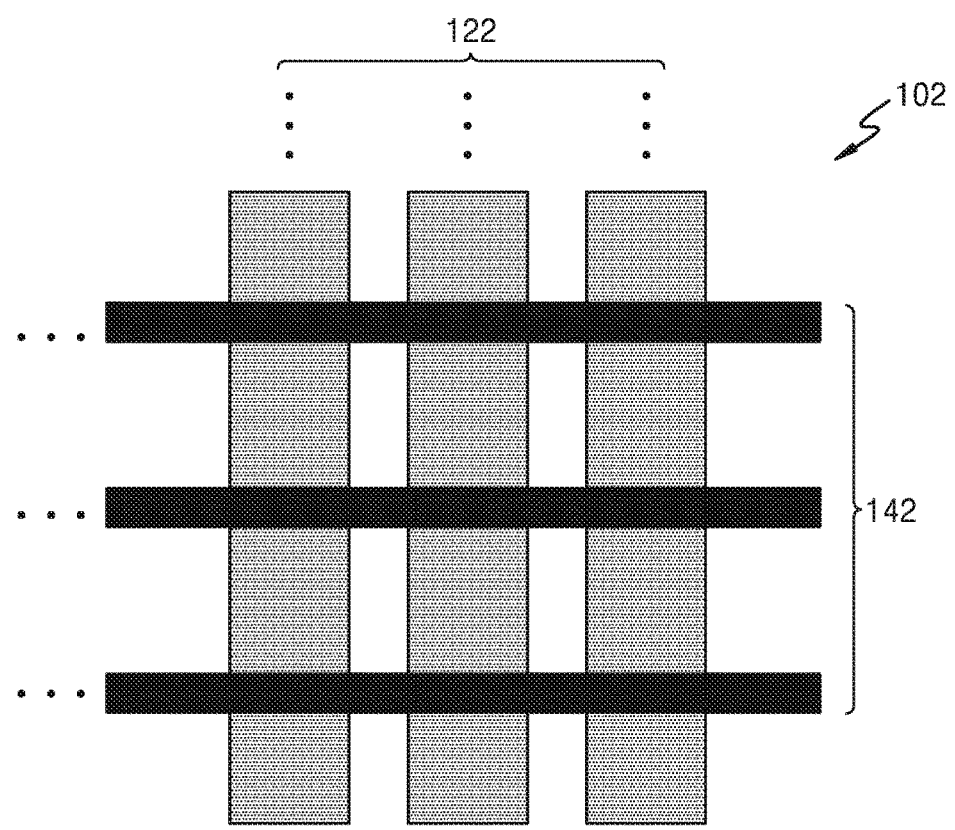
FIG. 14 is a plan view of shapes of driving electrodes and detection electrodes in a touch-fingerprint complex sensor according to another exemplary embodiment.

FIG. 14 is a plan view of shapes of driving electrodes and detection electrodes in a touch-fingerprint complex sensor 102 according to another exemplary embodiment.

The touch-fingerprint complex sensor 102 is different from the above-described touch-fingerprint complex sensor 100 in shapes of first and second electrodes included in driving electrode portions 122 and detection electrode portions 142, and thus only a difference in the electrode shape is shown.

Widths of the electrodes of the driving electrode portions 122 are greater than widths of the electrodes of the detection electrode portions 142. Such a structure may increase intensity of an electric field formed by driving signals applied to the detection electrode portions 142 as much as possible, and thus a capacitance variation due to a touch may be used to increase sensitivity of electrical signals detected from the detection electrode portions 142.

Figure 15:
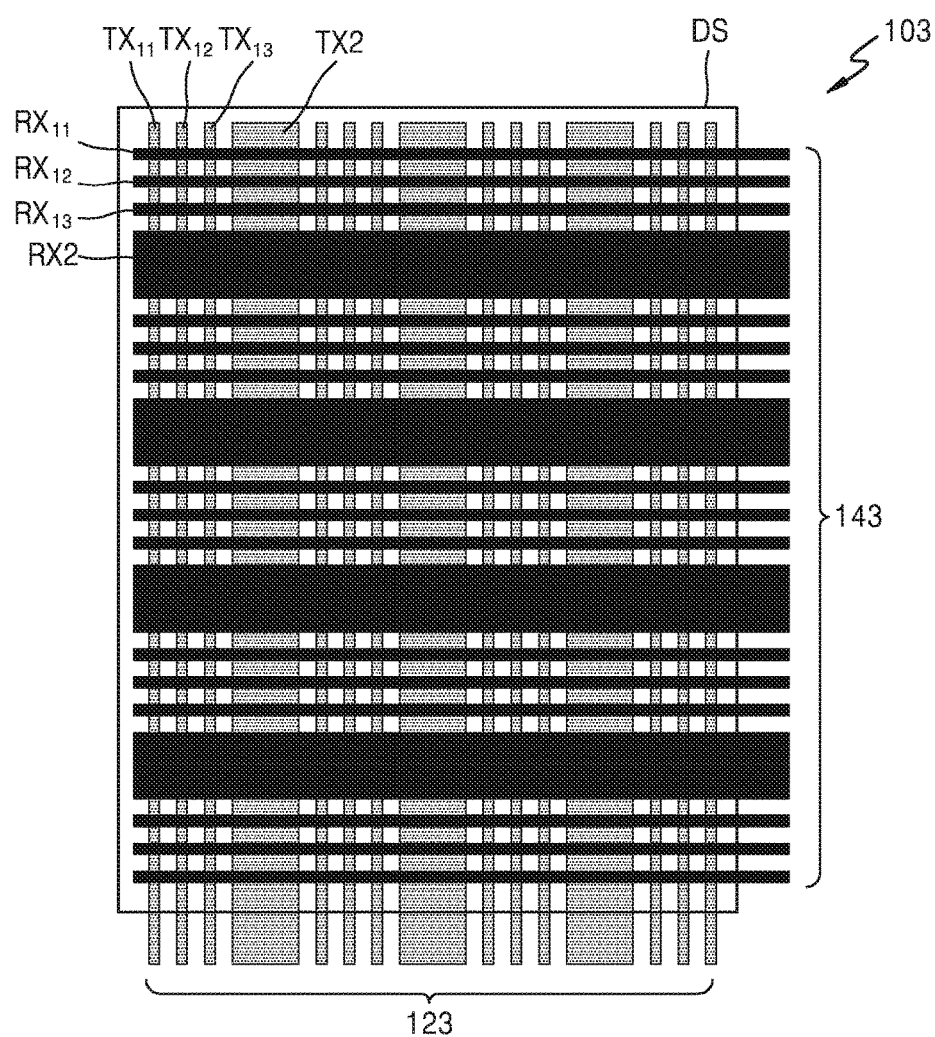
FIG. 15 is a plan view of a schematic configuration of a touch-fingerprint complex sensor according to another exemplary embodiment.

FIG. 15 is a plan view of a schematic configuration of a touch-fingerprint complex sensor 103 according to another exemplary embodiment.

The touch-fingerprint complex sensor 103 includes a driving electrode portion 123 and a detection electrode portion 143.

The driving electrode portion 123 includes the plurality of first electrodes TX repeatedly arranged in one direction. The plurality of first electrodes TX may include the first touch-fingerprint electrode $TX_{mj}$ having a small width and a plurality of first touch electrodes $TX_m$ having relatively great widths.

The detection electrode portion 143 includes the plurality of second electrodes RX repeatedly arranged in a direction crossing the one direction. The crossing direction may be an orthogonal direction. The plurality of second electrodes RX may include the second touch-fingerprint electrode $RX_{nk}$ having a small width and a plurality of second touch electrodes $RX_n$ having relatively great widths.

The above-described layout of the electrodes included in the driving electrode portion 123 and the detection electrode portion 143 may form the touch detection areas TA and the touch-fingerprint detection areas TFA as shown in FIG. 3.

Referring to FIGS. 3 and 15, the touch-fingerprint detection areas TFA may be used as areas detecting touches and fingerprints and may be areas in which the first touch-fingerprint electrodes $TX_{11}$, $TX_{12}$, and $TX_{13}$ and the second touch-fingerprint electrodes $RX_{11}$, $RX_{12}$, and $RX_{13}$ cross each other. The touch-fingerprint detection areas TFA may be the areas detecting touches, and thus an entire area of the display surface DS may be the touch detection area TA. When the touch detection area TA is disposed in a shape of an M×N matrix, the touch-fingerprint detection areas TFA may be formed in positions in which (row, column) are expressed as (odd, odd) in the matrix. That is, in a 9×7 matrix, the touch-fingerprint detection areas TFA may be disposed in (1, 1), (1, 3), . . . (3, 1), (3, 3), . . . , (9, 1), . . . (9, 3), . . . and (9, 7).

The touch-fingerprint detection areas TFA may be determined according to positions of the first touch-fingerprint electrodes $TX_{11}$, $TX_{12}$, and $TX_{13}$ having small widths, the first touch electrodes TX2 having great widths, the second touch-fingerprint electrodes $RX_{11}$, $RX_{12}$, and $RX_{13}$ having small widths, and the second touch electrodes RX2 having great widths as shown in FIG. 15. Such a layout order may be changed. Thus, the touch-fingerprint detection areas TFA may be formed in positions in which (row, column) are expressed as one rule of (odd, even), (even, even), and (even odd) in the matrix.

The widths of the first touch-fingerprint electrodes $TX_{11}$, $TX_{12}$, and $TX_{13}$ and the widths of the second touch-fingerprint electrodes $RX_{11}$, $RX_{12}$, and $RX_{13}$ may be the same, and the widths of the first touch electrodes TX2 and the widths of the second touch electrodes RX2 may be the same. However, the exemplary embodiments are not limited thereto.

A number of the first touch-fingerprint electrodes $TX_{11}$, $TX_{12}$, and $TX_{13}$ may be disposed between the plurality of first touch electrodes TX2. A number of the second touch-fingerprint electrodes $RX_{11}$, $RX_{12}$, and $RX_{13}$ may be disposed between the plurality of second touch electrodes RX2. The number of these is 3 in FIG. 15, but this is an example and is not limited thereto.

In a fingerprint sensing mode, electrical signals may be independently applied to the first touch-fingerprint electrodes $TX_{11}$, $TX_{12}$, and $TX_{13}$ such that separate channels are formed, and electrical signals may be independently output from the second touch-fingerprint electrodes $RX_{11}$, $RX_{12}$, and $RX_{13}$.

In a touch sensing mode, the same electrical signal may be applied to the first touch-fingerprint electrodes $TX_{11}$, $TX_{12}$, and $TX_{13}$ disposed between the plurality of first touch electrodes TX2 such that a single channel is formed, and electrical signals may be summed and output in the second touch-fingerprint electrodes $RX_{11}$, $RX_{12}$, and $RX_{13}$ disposed between the plurality of second touch electrodes RX2.

The implementations shown and described herein are illustrative examples of the inventive concept and are not intended to otherwise limit the scope of the inventive concept in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It may be noted that many alternative or additional functional relationships, physical connections or logical connections may be present in a practical device.

As described above, the above-described electronic device may provide high user convenience because a plurality of areas detecting fingerprints is distributed on a display surface.

Patterns of electrodes included in a driving electrode portion and a detection electrode portion may be uniformly or regularly formed on an entire area of the display surface, and thus a reduction in the image visibility due to the patterns of the electrodes may be decreased.

In addition, the exemplary embodiments may also be implemented through computer-readable code and/or instructions on a medium, e.g., a computer-readable medium, to control at least one processing element to implement any above-described exemplary embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic device comprising:
a display panel configured to display an image;
first electrodes provided on the display panel and arranged in parallel in a first direction;
second electrodes provided on the display panel and arranged in parallel in a second direction crossing the first electrodes;
an insulating layer provided between the first electrodes and the second electrodes;
a controller configured to transmit driving signals to the first electrodes, and receive electrical signals from the second electrodes;
first connection electrodes, each of the first connection electrodes connecting ends of at least two adjacent first ones of the first electrodes, and the first connection electrodes being repeatedly arranged;
second connection electrodes, each of the second connection electrodes connecting ends of at least two adjacent first ones of the second electrodes, and the second connection electrodes being repeatedly arranged;
touch detection areas in which the first electrodes cross the second electrodes, the touch detection areas being of the display panel; and
fingerprint-touch detection areas comprising each area in which at least two adjacent second ones of the first electrodes that are not connected to the first connection electrodes cross at least two adjacent second ones of the second electrodes that are not connected to the second connection electrodes, the fingerprint-touch detection areas being of the display panel.

2. The electronic device of claim 1, wherein each of the first electrodes has a strip shape of a first width, and
the first electrodes are repeatedly arranged with a first period between each pair of the first electrodes.

3. The electronic device of claim 2, wherein each of the second electrodes has a strip shape of a second width, and
the second electrodes are repeatedly arranged with a second period between each pair of the second electrodes.

4. The electronic device of claim 3, wherein the first width of the first electrodes is approximately equal to the second width of the second electrodes, and
the first period between each pair of the first electrodes is approximately equal to the second period between each pair of the second electrodes.

5. The electronic device of claim 3, wherein the first width of the first electrodes is greater than the second width of the second electrodes.

6. The electronic device of claim 1, wherein each of the first electrodes has a shape of first diamond patterns that are connected by first connection patterns, and
the first electrodes are repeatedly arranged with a first period between each pair of the first electrodes.

7. The electronic device of claim 6, wherein each of the second electrodes has a shape of second diamond patterns that are connected by second connection patterns, and
the second electrodes are repeatedly arranged at a second period between each pair of the second electrodes.

8. The electronic device of claim 7, wherein the first diamond patterns of the first electrodes and the second diamond patterns of the second electrodes are disposed on a surface of the display panel, and
the insulating layer is disposed between the first connection patterns of the first electrodes and the second connection patterns of the second electrodes crossing the first connection patterns of the first electrodes.

9. The electronic device of claim 1, wherein the first connection electrodes face an outer area of a display surface of the display panel.

10. The electronic device of claim 1, wherein a first number of the first electrodes connected to one among the first connection electrodes is equal to a second number of the first electrodes between each pair of the first connection electrodes.

11. The electronic device of claim 1, wherein the second connection electrodes face an outer area of a display surface of the display panel.

12. The electronic device of claim 1, wherein a first number of the second electrodes connected to one among the second connection electrodes is equal to a second number of the second electrodes between each pair of the second connection electrodes.

13. The electronic device of claim 1, wherein the controller is further configured to, when the electronic device is in a fingerprint sensing mode, transmit the driving signals respectively to the at least two adjacent second ones of the first electrodes not connected to the first connection electrodes, in each of the fingerprint-touch detection areas, such that separate channels are formed, and to receive the electrical signals respectively from the at least two adjacent second ones of the second electrodes not connected to the second connection electrodes, in each of the fingerprint-touch detection areas.

14. The electronic device of claim 1, wherein the controller is further configured to, when the electronic device is in a touch sensing mode, transmit a same driving signal to the first electrodes between the first connection electrodes, such that a single channel is formed, and to sum and receive a same electrical signal from the second electrodes between the second connection electrodes.

15. The electronic device of claim 1, wherein the first electrodes comprise first touch-fingerprint electrodes, each of the first touch-fingerprint electrodes having a first width, and first touch electrodes, each of the first touch electrodes having a second width greater than the first width, and the second electrodes comprise second touch-fingerprint electrodes, each of the second touch-fingerprint electrodes having a third width, and second touch electrodes, each of the second touch electrodes having a fourth width greater than the third width.

16. The electronic device of claim 15, wherein the first width is approximately equal to the third width, and the second width is approximately equal to the fourth width.

17. The electronic device of claim 15, wherein a first constant number of the first electrodes are disposed between each pair of the first touch electrodes, and a second constant number of the second electrodes are disposed between each pair of the second touch electrodes.

18. The electronic device of claim 15, wherein the controller is further configured to, when the electronic device is in a fingerprint sensing mode, transmit the driving signals respectively to the first touch-fingerprint electrodes, such that separate channels are formed, and to receive the electrical signals respectively from the second touch-fingerprint electrodes.

19. The electronic device of claim 1, wherein the display panel comprises:

a display element configured to display the image; and a cover layer configured to protect the display element.

20. The electronic device of claim 1, wherein the display panel is a liquid crystal display panel or an organic light emitting display panel.

21. The electronic device of claim 1, wherein the electronic device is a portable mobile communication device.

22. An electronic device comprising:

a display panel configured to display an image;

first electrodes provided on the display panel and arranged in parallel in a first direction;

second electrodes provided on the display panel and arranged in parallel in a second direction crossing the first electrodes;

an insulating layer provided between the first electrodes and the second electrodes;

a controller configured to transmit driving signals to the first electrodes, and receive electrical signals from the second electrodes;

first connection electrodes connecting ends of some of adjacent first electrodes among the first electrodes, the first connection electrodes being repeatedly arranged;

second connection electrodes connecting ends of some of adjacent second electrodes among the second electrodes, the second connection electrodes being repeatedly arranged;

touch detection areas in which the first electrodes cross the second electrodes; and fingerprint-touch detection areas comprising all areas in which the first electrodes not connected to the first connection electrodes cross the second electrodes not connected to the second connection electrodes, the all areas being of the display panel, wherein the first electrodes comprise first touch-fingerprint electrodes, each of the first touch-fingerprint electrodes having a first width, and first touch electrodes, each of the first touch electrodes having a second width greater than the first width, the second electrodes comprise second touch-fingerprint electrodes, each of the second touch-fingerprint electrodes having a third width, and second touch electrodes, each of the second touch electrodes having a fourth width greater than the third width, and the controller is further configured to, when the electronic device is in a touch sensing mode, transmit a same driving signal to the first touch-fingerprint electrodes between the first touch electrodes, such that a single channel is formed, and to sum and receive a same electrical signal from the second touch-fingerprint electrodes between the second touch electrodes.

* * * * *